United States Patent
Wand

(10) Patent No.: US 8,437,786 B1
(45) Date of Patent: May 7, 2013

(54) METHOD AND DEVICE FOR ADJUSTING FREQUENCY BAND MODE

(71) Applicant: Huawei Technologies Co., Ltd., Guangdong (CN)

(72) Inventor: Shaolei Wand, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/687,933

(22) Filed: Nov. 28, 2012

Related U.S. Application Data

(63) Continuation of application No. PCT/CN2012/078980, filed on Jul. 20, 2012.

(30) Foreign Application Priority Data

Dec. 21, 2011 (CN) .......................... 2011 1 0433089

(51) Int. Cl.
*H04B 15/00* (2006.01)

(52) U.S. Cl.
USPC ........ 455/501; 455/443; 455/446; 455/67.13; 455/63.1; 455/63.2

(58) Field of Classification Search .................. 455/443, 455/446, 447, 448, 449, 450, 451, 561, 67.13, 455/63.1–63.4, 562.1, 509, 464, 507, 524, 455/501, 566
See application file for complete search history.

(56) References Cited

U.S. PATENT DOCUMENTS

| | | | |
|---|---|---|---|
| 6,181,918 B1 * | 1/2001 | Benveniste | 455/63.2 |
| 6,744,743 B2 * | 6/2004 | Walton et al. | 370/318 |
| 7,440,758 B2 * | 10/2008 | Zhang et al. | 455/446 |
| 8,340,677 B2 * | 12/2012 | Ma et al. | 455/452.1 |
| 2006/0121906 A1 * | 6/2006 | Stephens et al. | 455/446 |
| 2012/0315935 A1 * | 12/2012 | Wang Helmersson et al. | 455/501 |
| 2013/0029673 A1 * | 1/2013 | Graves et al. | 455/446 |

FOREIGN PATENT DOCUMENTS

| | | |
|---|---|---|
| CN | 1553581 A | 12/2004 |
| CN | 1668954 A | 9/2005 |
| CN | 1795690 A | 6/2006 |
| CN | 1901405 A | 1/2007 |
| CN | 101093911 A | 12/2007 |
| CN | 101137158 A | 3/2008 |
| CN | 101150836 A | 3/2008 |

(Continued)

OTHER PUBLICATIONS

International Search Report and Written Opinion of the International Searching Authority in corresponding International Patent Application No. PCT/CN2012/078980 (Oct. 18, 2012).

*Primary Examiner* — Sujatha Sharma
(74) *Attorney, Agent, or Firm* — Leydig, Voit & Mayer, Ltd.

(57) ABSTRACT

Embodiments of the present invention provide a method and a device for adjusting a frequency band mode, which relate to the field of wireless communications. The method includes: according to pre-stored base station location information and an azimuth of an antenna of each base station, displaying each base station and the antenna of each base station on a map by using a base station identifier and an antenna identifier respectively; and according to a pre-stored range of cells covered by each antenna and environment information of each cell, obtaining a configured neighboring cell of each cell, and displaying the cell covered by each antenna and the configured neighboring cell of each cell on the map.

10 Claims, 7 Drawing Sheets

FOREIGN PATENT DOCUMENTS

| | | |
|---|---|---|
| CN | 101340698 A | 1/2009 |
| CN | 101692734 A | 4/2010 |
| CN | 102110139 A | 6/2011 |
| CN | 102118771 A | 7/2011 |
| CN | 102131202 A | 7/2011 |
| CN | 102143525 A | 8/2011 |

* cited by examiner

METHOD AND DEVICE FOR ADJUSTING FREQUENCY BAND MODE

CROSS-REFERENCE TO RELATED APPLICATIONS

This application is a continuation of International Patent Application No. PCT/CN2012/078980, filed on Jul. 20, 2012, which claims priority to Chinese Patent Application No. 201110433089.7, filed on Dec. 21, 2011, both of which are hereby incorporated by reference in their entireties.

FIELD OF THE INVENTION

The present invention relates the field of wireless communications, and in particular, to a method and a device for adjusting a frequency band mode.

BACKGROUND OF THE INVENTION

With the rapid development of a wireless communication technology, a mainstream technology of a long term evolution technology (Long Term Evolution, may be briefly referred to as LTE) for transiting from a 3G technology to a 4G technology is deployed globally. The operators face a network in which the LTE, a global system for mobile communications (global system for mobile communications, may be briefly referred to as GSM), and a universal mobile telecommunications system (Universal Mobile Telecommunications System, may be briefly referred to as UMTS) coexist. Therefore, it is proposed that intra-frequency multiplexing of the LTE is used as much as possible, so that a problem of intra-frequency interference is prominent.

How to solve interference analysis effectively and adjust a frequency band mode is an emphasis of operation and maintenance of the LTE network. A method for analyzing and solving the intra-frequency interference in the prior art is analyzing, by querying a table, a cell that needs a frequency band mode adjustment, giving an adjustment advice and performing an adjustment. With this manner, the status of a configured neighboring cell of the cell cannot be intuitively displayed, whether interference exists between the adjustment advice and other neighboring cells cannot be determined, and labor and time are consumed for table querying.

SUMMARY OF THE INVENTION

Embodiments of the present invention provide a method and a device for adjusting a frequency band mode. By displaying a cell covered by an antenna of each base station, a frequency band mode used by the cell and a coverage range of the used frequency band mode on the map, manual operation for frequency band mode adjustment is reduced, and operating efficiency is improved.

In order to achieve the foregoing object, the embodiments of the present invention adopt the following technical solutions.

In one aspect, a method for adjusting a frequency band mode is provided, which includes:

according to pre-stored base station location information and an azimuth of an antenna of each base station, displaying each base station and the antenna of each base station on a map by using a base station identifier and an antenna identifier respectively;

according to a pre-stored range of cells covered by each antenna and environment information of each cell, obtaining a configured neighboring cell of each cell, and displaying a cell covered by each antenna and the configured neighboring cell of each cell on the map;

by using a frequency band identifier, displaying a frequency band mode used by each antenna on a map corresponding to each cell, where the antennas using the same frequency band mode have same frequency band identifiers, and the frequency band mode is used to represent a frequency range used by each antenna for sending or receiving a signal;

searching for adjacent intra-frequency mode cells and determining an interfering cell, where if the cell covered by the antenna and the configured neighboring cell of the cell use a same frequency band mode, the cell covered by the antenna and the configured neighboring cell of the cell are adjacent intra-frequency mode cells to each other, and determining any one cell of the intra-frequency mode cells to each other to be the interfering cell; and adjusting the frequency band identifier used by the interfering cell, so that the interfering cell and the configured neighboring cell of the cell have different frequency band identifiers on the map, and according to the adjusted frequency band identifier of the interfering cell on the map, adjusting the frequency band mode of the interfering cell to a frequency band mode corresponding to the adjusted frequency band identifier of the interfering cell.

In one aspect, a device for adjusting a frequency band mode is provided, which includes:

a first display unit, configured to, according to pre-stored base station location information and an azimuth of an antenna of each base station, display each base station and the antenna of each base station on a map by using a base station identifier and an antenna identifier respectively;

a second display unit, configured to, according to a pre-stored range of cells covered by each antenna and environment information of each cell, obtain a configured neighboring cell of each cell, and display the cell covered by each antenna and the configured neighboring cell of each cell on the map;

a third display unit, configured to, by using a frequency band identifier, display a frequency band mode used by each antenna on a map corresponding to each cell, where antennas using a same frequency band mode have same frequency band identifiers, and the frequency band mode is used to represent a frequency range used by each antenna for sending or receiving a signal;

a searching and determining unit, configured to search for adjacent intra-frequency mode cells and determine an interfering cell, where if the cell covered by the antenna and the configured neighboring cell of the cell use a same frequency band mode, the cell covered by the antenna and the configured neighboring cell of the cell are adjacent intra-frequency mode cells to each other, and determine any one cell of the intra-frequency mode cells to each other to be the interfering cell; and an adjustment unit, configured to adjust the frequency band identifier used by the interfering cell, so that the interfering cell and the configured neighboring cell of the cell have different frequency band identifiers on the map, and according to the adjusted frequency band identifier of the interfering cell on the map, adjust the frequency band mode of the interfering cell to a frequency band mode corresponding to the adjusted frequency band identifier of the interfering cell.

In the method and the device for adjusting a frequency band mode provided by the embodiments of the present invention, by displaying the cell covered by the antenna of each base station, the frequency band mode used by the cell and the coverage range of the used frequency band mode, the configured neighboring cell of the cell and the interfering cell on the map, the status of the neighboring cell of the cell may be intuitively displayed. In this way, when intra-frequency interference analysis is performed, and the frequency band mode of the interfering cell is adjusted, manual operations are reduced, and the operating efficiency is improved.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The following describes the technical solutions of the present invention clearly and completely with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
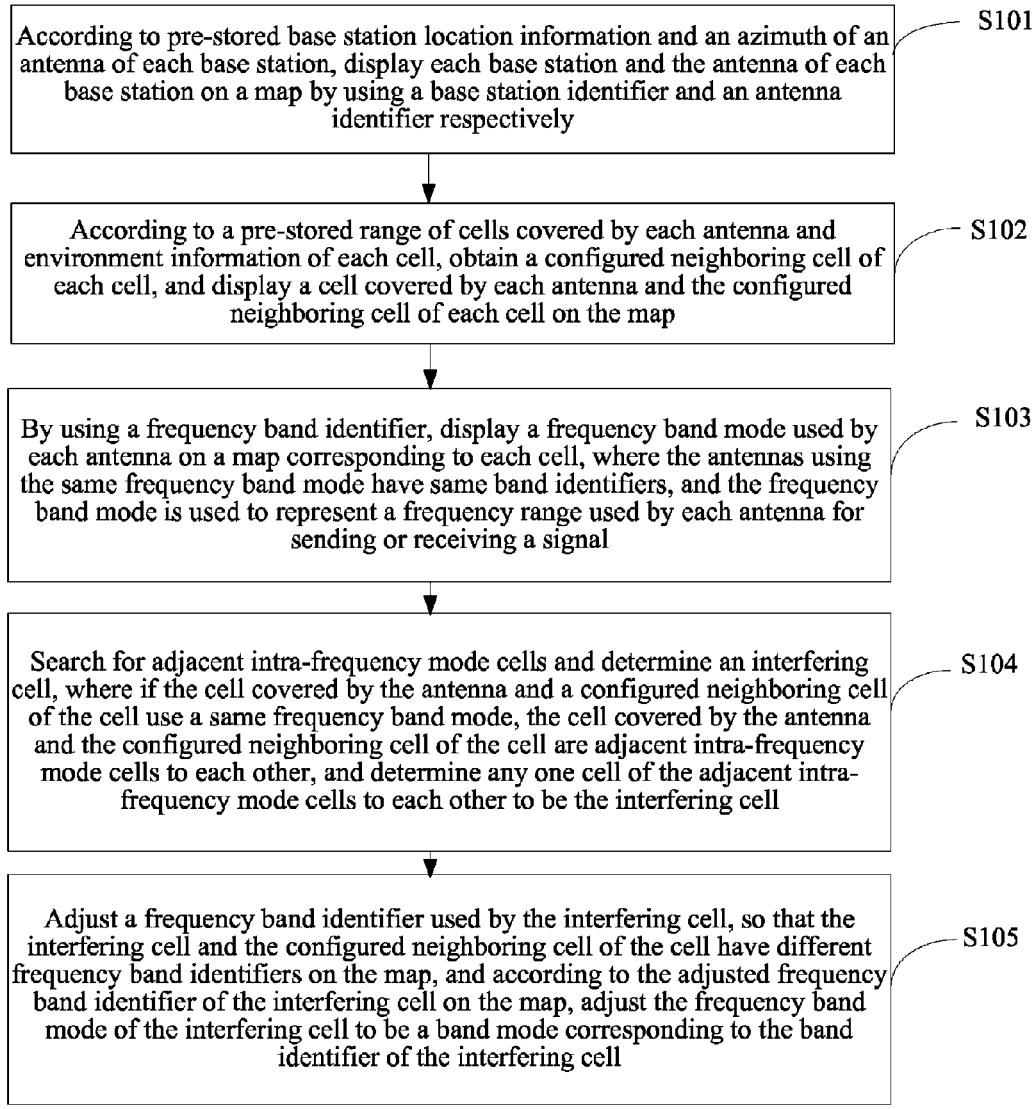
FIG. 1 is a flow chart of a method for adjusting a frequency band mode provided by an embodiment of the present invention.

An embodiment of the present invention provides a method for adjusting a frequency band mode, which, as shown in FIG. 1, includes:

S101: According to pre-stored base station location information and an azimuth of an antenna of each base station, display each base station and the antenna of each base station on a map by using a base station identifier and an antenna identifier respectively.

Exemplarily, a pre-stored azimuth of the antenna being 60 degrees is taken as an example for illustration.

After the base station identifier is displayed on the map according to pre-stored information about longitude of the base station, latitude of the base station and the number of the base station, a direction of the antenna identifier is obtained according to the azimuth of the antenna, and the antenna identifier is displayed on the map. Preferably, three antennas are set for each base station correspondingly. Specifically, a method for obtaining the direction of the antenna identifier according to the azimuth of the antenna is: starting from a line pointing to a direction of north, after clockwise rotating 60 degrees, a pointed direction is the direction of the antenna. The antenna identifier is displayed on the map according to the antenna direction, and a preferable antenna identifier is a sectoral identifier.

S102: According to a pre-stored range of cells covered by each antenna and environment information of each cell, obtain a configured neighboring cell of each cell, and display a cell covered by each antenna and the configured neighboring cell of each cell on the map.

Specifically, a wireless coverage area of an antenna is referred to as a cell, and a range of cells covered by the antenna may be obtained according to pre-stored configuration data, where the configuration data includes distance between cells, hanging height of an antenna of a cell, the azimuth of the antenna and a downtilt angle of the antenna. The environment information of a cell refers to terrain and a landform of the cell and those around the cell, which specifically is reflected by such as a mountain, a canyon, and a river.

The location of an antenna of a base station may be obtained according to the longitude and the latitude of the base station. If a range of cells covered by a first antenna of a first base station and a range of cells covered by a second antenna of a second base station have an overlapping area, and it is determined, according to the pre-stored environment information, that no terrain that blocks signals exists between a cell covered by the first antenna and a cell covered by the second antenna, the cell covered by the first antenna and the cell covered by the second antenna are configured neighboring cells to each other. Therefore, it is obvious that a configured neighboring cell of each cell may be obtained. For example, if the range of cells covered by the first antenna and the range of cells covered by the second antenna have the overlapping area, and terrain that blocks signals exists between the two cells, for example a high mountain exists between the two cells, the cell covered by the first antenna and the cell covered by the second antenna are not configured neighboring cells to each other. On the contrary, if the range of cells covered by the first antenna and the range of cells covered by the second antenna have the overlapping area, and no terrain that blocks signals exists between the two cells, the cell covered by the first antenna and the cell covered by the second antenna are configured neighboring cells to each other. In this way, the cell covered by the antenna and the configured neighboring cell of the cell may be obtained and displayed on the map.

S103: By using a frequency band identifier, display a frequency band mode used by each antenna on a map corresponding to each cell, where the antennas using the same frequency band mode have same frequency band identifiers, and the frequency band mode is used to represent a frequency range used by each antenna for sending or receiving a signal.

Figure 2:
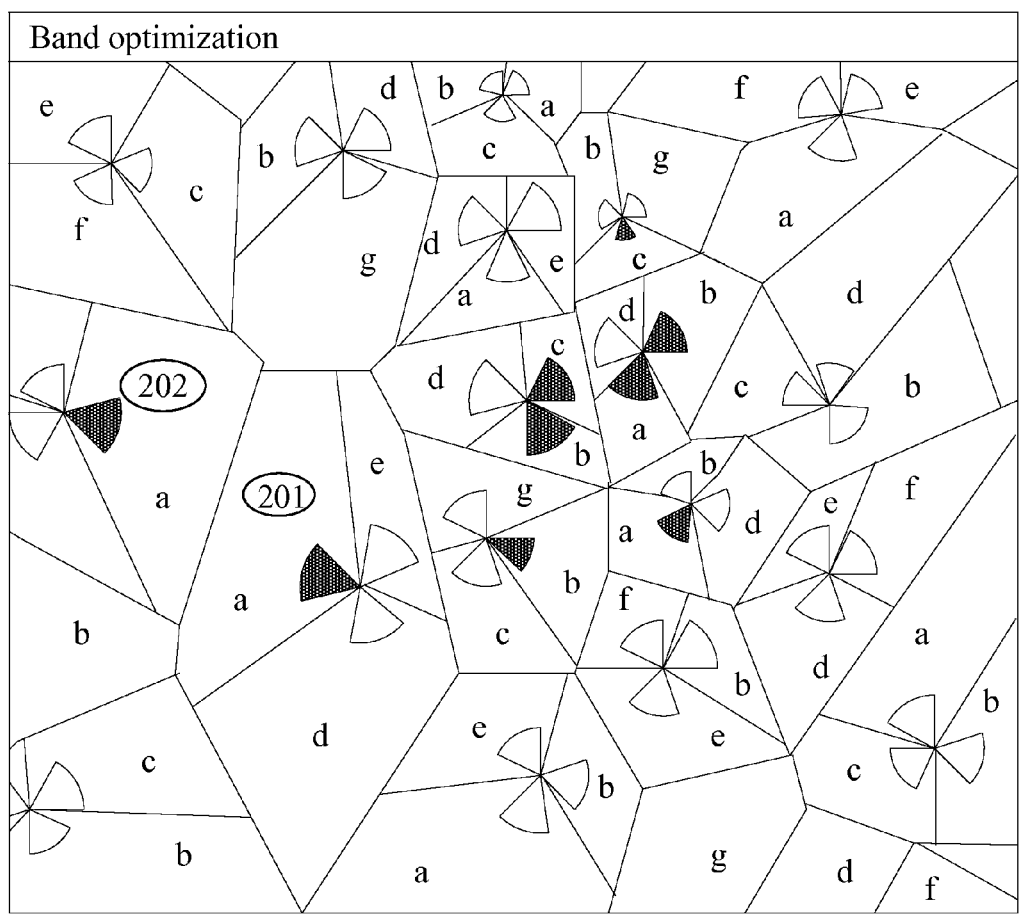
FIG. 2 is a diagram which displays an interface of frequency band mode adjustment provided by an embodiment of the present invention.

Exemplarily, as shown in FIG. 2, different letters are displayed on polygons corresponding to each cell on a map (not shown in the figure) to identify different frequency band modes. Definitely, the antennas of the same frequency band mode have the same frequency band identifiers. In this way, as shown in FIG. 2, a cell, a configured neighboring cell of the cell, the frequency band mode of the cell, the frequency band mode of the configured neighboring cell of the cell and a relationship therebetween are displayed on the map.

In another implementation manner of the present invention, different colors may be displayed on the polygons corresponding to each cell on the map so as to identify different frequency band modes.

S104: Search for adjacent intra-frequency mode cells and determine an interfering cell, where if the cell covered by the antenna and a configured neighboring cell of the cell use a same frequency band mode, the cell covered by the antenna and the configured neighboring cell of the cell are adjacent intra-frequency mode cells to each other, and determine any one cell of the adjacent intra-frequency mode cells to each other to be the interfering cell.

Specifically, as shown in FIG. 2, a cell 201 and a cell 202 are displayed as configured neighboring cells on the map, and the cell 201 and the cell 202 use the same frequency band mode a. Therefore, the interference exists between the cell 201 and the cell 202, any one of the cell 201 and the cell 202 may be defined as the interfering cell, and the other is a non-interfering cell relative to the interfering cell, that is, a cell that does not need a frequency band mode adjustment. In this embodiment, the cell 201 is the interfering cell, and the cell 202 is the non-interfering cell of the cell 201. It can be seen that, by using the method of displaying the frequency band mode used by each cell on the map, the interfering cell may be rapidly, effectively, and intuitively found.

S105: Adjust a frequency band identifier used by the interfering cell, so that the interfering cell and the configured neighboring cell of the cell have different frequency band identifiers on the map, and according to the adjusted frequency band identifier of the interfering cell on the map, adjust the frequency band mode of the interfering cell to a frequency band mode corresponding to the adjusted frequency band identifier of the interfering cell.

Figure 3:
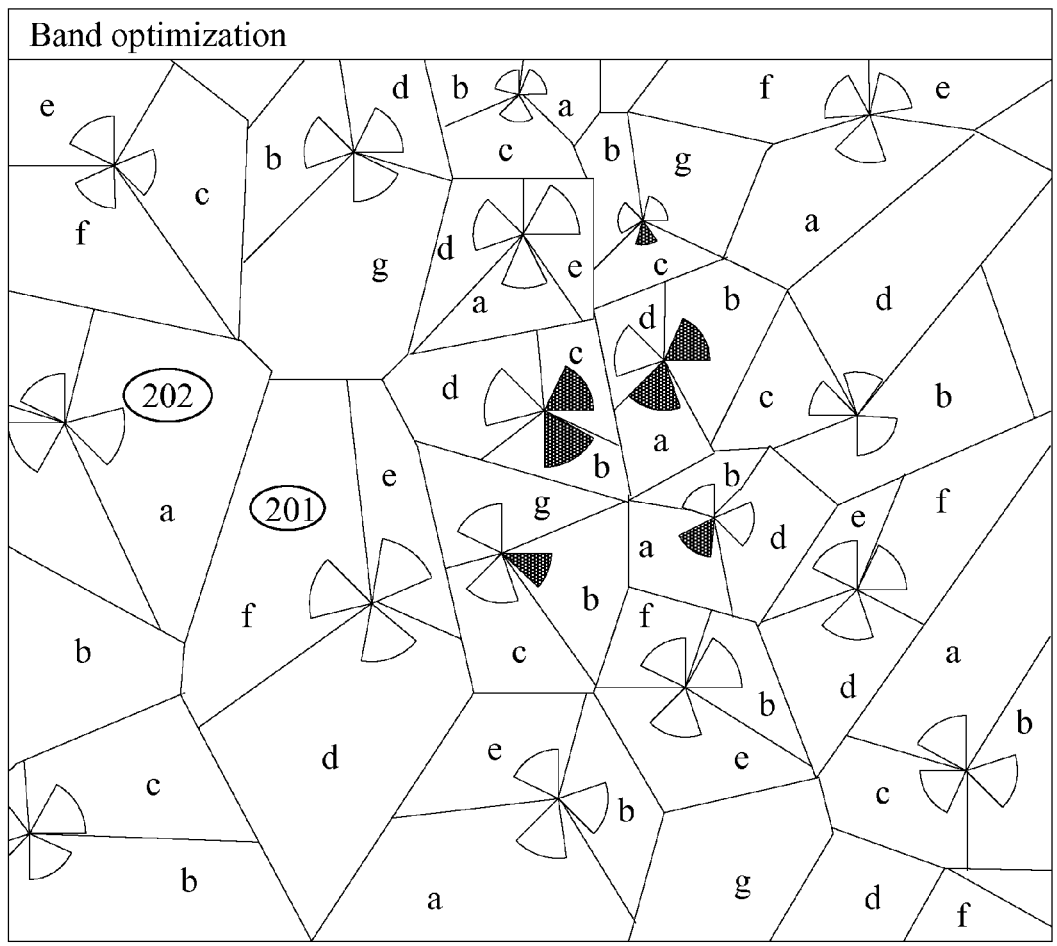
FIG. 3 is a diagram which displays another interface of frequency band mode adjustment provided by an embodiment of the present invention.

Specifically, the frequency band identifier of the interfering cell and the frequency band identifier of the configured neighboring cell of the cell on the map are adjusted to different frequency band identifiers. As shown in FIG. 2, the frequency band identifiers of both the interfering cell 201 and the configured neighboring cell 202 of the cell 201 are a. After the adjustment, as shown in FIG. 3, the frequency band identifier of the interfering cell 201 is f, and the frequency band identifier of the configured neighboring cell 202 of the cell 201 is still a. By performing the foregoing steps, the adjusted frequency band identifiers are displayed on the map. Compared with the prior art, whether interference exists between the adjustment advice about the frequency band identifier and other neighboring cells may be determined, which facilitates further analysis and confirmation, and labor and time are saved because the frequency band mode of the interfering cell is adjusted according to the confirmed frequency band identifier on the map.

In the method for adjusting a frequency band mode provided by the embodiment of the present invention, by displaying a cell covered by an antenna of each base station, the frequency band mode used by the cell and the coverage range of the used frequency band mode, the configured neighboring cell of the cell and the interfering cell on the map, the status of the neighboring cell of the cell may be intuitively displayed. In this way, when the intra-frequency interference analysis is performed and the frequency band mode of the interfering cell is adjusted, manual operations are reduced, and the operating efficiency is improved.

Figure 4:
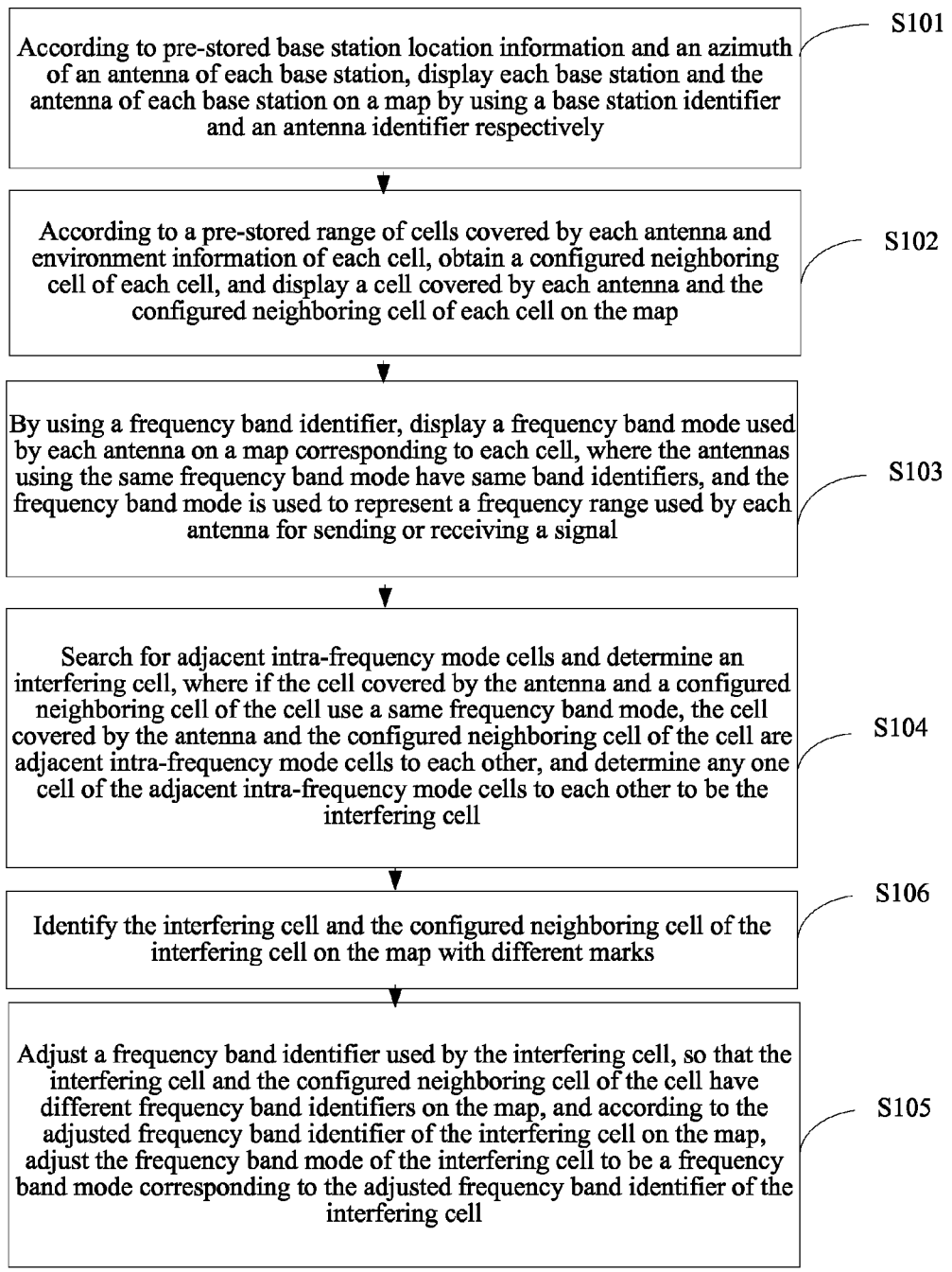
FIG. 4 is a flow chart of another method for adjusting a frequency band mode provided by an embodiment of the present invention.

Further, after S104, and before S105, as shown in FIG. 4, the following is included:

S106: Identify the interfering cell and the configured neighboring cell of the interfering cell on the map with different marks.

Figure 5:
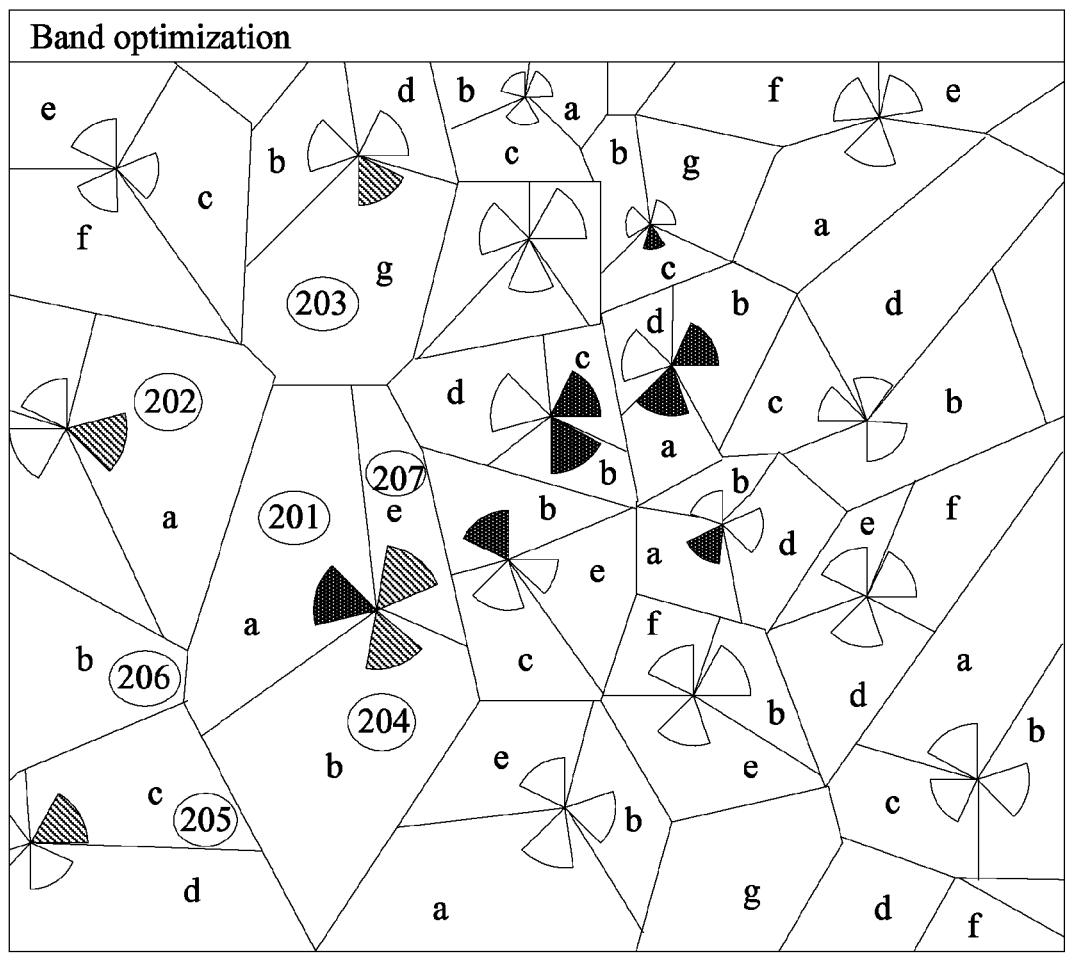
FIG. 5 is a diagram which displays still another interface of frequency band mode adjustment provided by an embodiment of the present invention.

Exemplarily, as shown in FIG. 5, after the interfering cell 201 is found, star points may be used to mark the interfering cell 201, and slashes may be used to mark neighboring cells of the interfering cell 201, namely, the cell 202, a cell 203, a cell 204, a cell 205, a cell 206, and a cell 207.

In this way, an interfering cell, a neighboring cell of the interfering cell and other cells may be distinguished easily. After the frequency band identifiers of the interfering cell and the neighboring cell of the interfering cell are referred to, an adjustment advice about the frequency band identifier may be given, and the frequency band mode may be adjusted according to the adjustment advice about the frequency band identifier, thereby further improving the operating efficiency.

In another implementation manner of the present invention, different colors may be used to mark the interfering cell and the neighboring cell of the interfering cell, and for example, the interfering cell is marked with a red identifier, and the neighboring cell of the interfering cell is marked with a green identifier.

Figure 6:
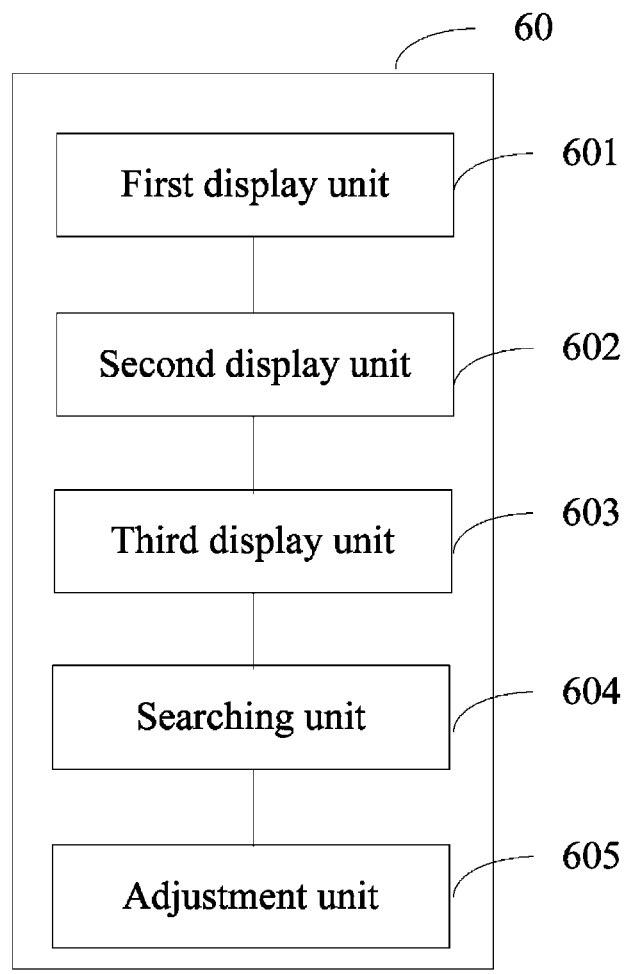
FIG. 6 is a schematic structural diagram of a device for adjusting a frequency band mode provided by an embodiment of the present invention.

An embodiment of the present invention provides a device 60 for adjusting a frequency band mode, which, as shown in FIG. 6, includes:

A first display unit 601 is configured to, according to pre-stored base station location information and an azimuth of an antenna of each base station, display each base station and the antenna of each base station on a map by using a base station identifier and an antenna identifier respectively.

Exemplarily, a pre-stored azimuth of the antenna being 60 degrees is taken as an example for illustration.

After the base station identifier is displayed on the map according to pre-stored information about longitude of the base station, latitude of the base station and the number of the base station, a direction of the antenna identifier is obtained according to the azimuth of the antenna, and the antenna identifier is displayed on the map. Preferably, three antennas are set for each base station correspondingly. Specifically, a method for obtaining the direction of the antenna identifier according to the azimuth of the antenna is: starting from a line pointing to a direction of north, after clockwise rotating 60 degrees, a pointed direction is the direction of the antenna. The antenna identifier is displayed on the map according to the antenna direction, and a preferable antenna identifier is a sectoral identifier.

A second display unit 602 is configured to, according to a pre-stored range of cells covered by each antenna and environment information of each cell, obtain a configured neighboring cell of each cell, and display a cell covered by each antenna and the configured neighboring cell of each cell on the map.

Specifically, a wireless coverage area of an antenna is referred to as a cell, and a range of cells covered by the antenna may be obtained according to pre-stored configuration data, where the configuration data includes distance between cells, hanging height of an antenna of a cell, the azimuth of the antenna and a downtilt angle of the antenna. The environment information of a cell refers to terrain and a landform of the cell and those around the cell, which specifically is reflected by such as a mountain, a canyon, and a river.

The location of an antenna of a base station may be obtained according to the longitude and the latitude of the base station. If a range of cells covered by a first antenna of a first base station and a range of cells covered by a second antenna of a second base station have an overlapping area, and it is determined according to the pre-stored environment information that no terrain blocking the signal exists between a cell covered by the first antenna and a cell covered by the second antenna, the cell covered by the first antenna and the cell covered by the second antenna are configured neighboring cells to each other. Therefore, it is obvious that a configured neighboring cell of each cell may be obtained. For example, if the range of cells covered by the first antenna and the range of cells covered by the second antenna have the overlapping area, and terrain that blocks signals exists between the two cells, for example a high mountain exists between the two cells, the cell covered by the first antenna and the cell covered by the second antenna are not configured neighboring cells to each other. On the contrary, if the range of cells covered by the first antenna and the range of cells covered by the second antenna have the overlapping area, and no terrain that blocks signals exists between the two cells, the cell covered by the first antenna and the cell covered by the second antenna are configured neighboring cells to each other. In this way, the cell covered by the antenna and the configured neighboring cell of the cell may be obtained and displayed on the map.

A third display unit 603 is configured to, by using a frequency band identifier, display a frequency band mode used by each antenna on a map corresponding to each cell, where the antennas using the same frequency band mode have same frequency band identifiers, and the frequency band mode is used to represent a frequency range used by each antenna for sending or receiving a signal.

Specifically, the frequency band mode refers to the frequency range used by each antenna for sending or receiving a signal, and different frequency band modes use different frequency band identifiers. Exemplarily, as shown in FIG. 2, different letters are displayed on polygons corresponding to each cell on a map (not shown in the figure) to identify different frequency band modes. Definitely, the antennas of the same frequency band mode have the same frequency band identifiers. In this way, as shown in FIG. 2, a cell, a configured neighboring cell of the cell, the frequency band mode of the cell, the frequency band mode of the configured neighboring cell of the cell and a relationship therebetween are displayed on the map.

In another implementation manner of the present invention, different colors may be displayed on the polygons corresponding to each cell on the map so as to identify different frequency band modes.

A searching and determining unit 604 is configured to search for adjacent intra-frequency mode cells and determine an interfering cell, where if the cell covered by the antenna and a configured neighboring cell of the cell use a same frequency band mode, the cell covered by the antenna and the configured neighboring cell of the cell are adjacent intra-frequency mode cells to each other, and determine any one cell of the intra-frequency mode cells to each other to be the interfering cell.

Specifically, as shown in FIG. 2, a cell 201 and a cell 202 are displayed as configured neighboring cells on the map, and the cell 201 and the cell 202 use the same frequency band mode a. Therefore, the interference exists between the cell 201 and the cell 202, any one of the cell 201 and the cell 202 may be defined as the interfering cell, and the other is a non-interfering cell relative to the interfering cell, that is, a cell that does not need a frequency band mode adjustment. In this embodiment, the cell 201 is the interfering cell, and the cell 202 is the non-interfering cell of the cell 201. It can be seen that, by using the method of displaying the frequency band mode used by each cell on the map, the interfering cell may be rapidly, effectively, and intuitively found.

An adjustment unit 605 is configured to adjust a frequency band identifier used by the interfering cell, so that the interfering cell and the configured neighboring cell of the cell have different frequency band identifiers on the map, and according to the adjusted frequency band identifier of the interfering cell on the map, adjust the frequency band mode of the interfering cell to a frequency band mode corresponding to the adjusted frequency band identifier of the interfering cell.

Specifically, the frequency band identifier of the interfering cell and the frequency band identifier of the configured neighboring cell of the cell on the map are adjusted to different frequency band identifiers. As shown in FIG. 2, the frequency band identifiers of both the interfering cell 201 and the configured neighboring cell 202 of the cell 201 are a. After the adjustment, as shown in FIG. 3, the frequency band identifier of the interfering cell 201 is f, and the frequency band identifier of the configured neighboring cell 202 of the cell 201 is still a. By performing the foregoing steps, the adjusted frequency band identifier is displayed on the map. Compared with the prior art, whether interference exists between the adjustment advice about the frequency band identifier and other neighboring cells may be determined, which facilitates further analysis and confirmation, and labor and time are saved because the frequency band mode of the interfering cell is adjusted according to the confirmed frequency band identifier on the map.

In the device for adjusting a frequency band mode provided by the embodiment of the present invention, by displaying a cell covered by an antenna of each base station, the frequency band mode used by the cell and the coverage range of the used frequency band mode, the configured neighboring cell of the cell and the interfering cell on the map, the status of the neighboring cell of the cell may be intuitively displayed. In this way, when the intra-frequency interference analysis is performed, and the frequency band mode of the interfering cell is adjusted, manual operations are reduced, and the operating efficiency is improved.

Figure 7:
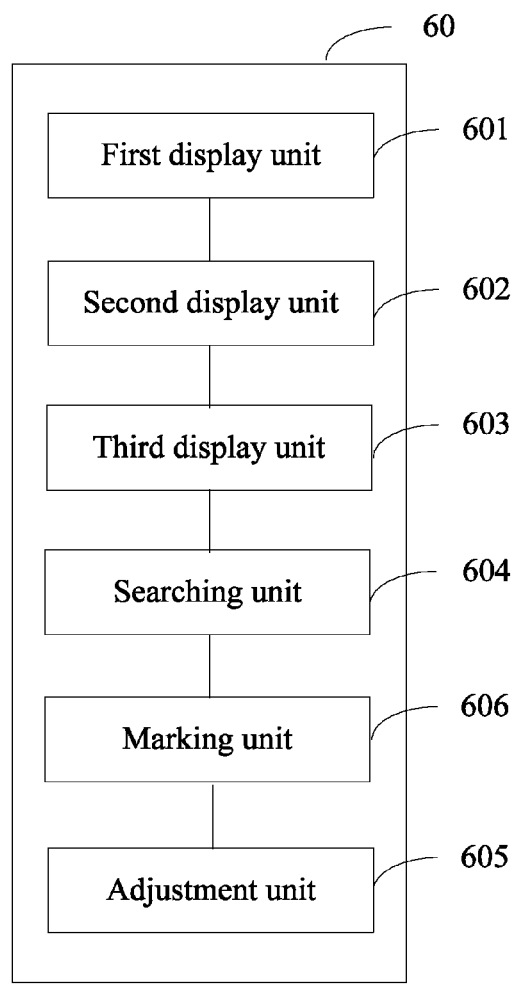
FIG. 7 is a schematic structural diagram of another device for adjusting a frequency band mode provided by an embodiment of the present invention.

Further, the device 60 for adjusting a frequency band mode, as shown in FIG. 7, further includes:

a marking unit 606, configured to identify the interfering cell and the configured neighboring cell of the interfering cell on the map with different marks.

Exemplarily, as shown in FIG. 5, after the interfering cell 201 is found, star points may be used to mark the interfering cell 201, and slashes may be used to mark neighboring cells of the interfering cell 201, namely, the cell 202, a cell 203, a cell 204, a cell 205, a cell 206, and a cell 207.

In this way, an interfering cell, a neighboring cell of the interfering cell and other cells may be distinguished easily. After the frequency band identifiers of the interfering cell and the neighboring cell of the interfering cell are referred to, an adjustment advice about the frequency band identifier may be given, and the frequency band mode may be adjusted according to the adjustment advice about the frequency band identifier, thereby further improving the operating efficiency.

In another implementation manner of the present invention, different colors may be used to mark the interfering cell and the neighboring cell of the interfering cell, and for example, the interfering cell is marked with a red identifier, and the neighboring cell of the interfering cell is marked with a green identifier.

The foregoing descriptions are merely exemplary embodiments of the present invention, but not intended to limit the present invention. Any variation or replacement made by persons skilled in the art without departing from the spirit of the present invention shall fall within the protection scope of the present invention. Therefore, the protection scope of the present invention shall be subject to the protection scope of the claims.

What is claimed is:

1. A method for adjusting a frequency band mode, comprising:
   according to pre-stored base station location information and an azimuth of an antenna of each base station, displaying each base station and the antenna of each base station on a map by using a base station identifier and an antenna identifier respectively;
   according to a pre-stored range of cells covered by each antenna and environment information of each cell, obtaining a configured neighboring cell of each cell, and displaying a cell covered by each antenna and the configured neighboring cell of each cell on the map;
   by using a frequency band identifier, displaying a frequency band mode used by each antenna on the map corresponding to each cell, wherein antennas using a same frequency band mode have same frequency band identifiers, and the frequency band mode is used to represent a frequency range used by each antenna for sending or receiving a signal;
   searching for adjacent intra-frequency mode cells and determining an interfering cell, wherein if the cell covered by the antenna and the configured neighboring cell of the cell use a same frequency band mode, the cell covered by the antenna and the configured neighboring cell of the cell are adjacent intra-frequency mode cells to each other, and determining any one cell of the intra-frequency mode cells to each other to be the interfering cell; and
   adjusting the frequency band identifier used by the interfering cell, so that the interfering cell and the configured neighboring cell of the cell have different frequency band identifiers on the map, and according to the adjusted frequency band identifier of the interfering cell on the map, adjusting the frequency band mode of the interfering cell to a frequency band mode corresponding to the adjusted frequency band identifier of the interfering cell.

2. The method for adjusting a frequency band mode according to claim 1, wherein after the searching for the adjacent intra-frequency mode cells and determining the interfering cell, and before the adjusting the frequency band identifier used by the interfering cell, the method further comprises:
   identifying the interfering cell and the configured neighboring cell of the interfering cell on the map with different marks.

3. The method for adjusting a frequency band mode according to claim 1, wherein if a range of cells covered by a first antenna of a first base station and a range of cells covered by a second antenna of a second base station have an overlapping area, and it is determined, according to the pre-stored environment information, that no terrain that blocks signals exists between a cell covered by the first antenna and a cell covered by the second antenna, the cell covered by the first antenna and the cell covered by the second antenna are configured neighboring cells to each other.

4. The method for adjusting a frequency band mode according to claim 1, wherein a range of cells covered by each antenna is determined according to pre-stored configuration data, wherein the configuration data comprises distance between the cells, hanging height of the antenna of the cell, the azimuth of the antenna and a downtilt angle of the antenna.

5. The method for adjusting a frequency band mode according to claim 1, wherein the frequency band identifier specifically is a letter identifier or a color identifier.

6. A device for adjusting a frequency band mode, comprising:
   a first display unit, configured to, according to pre-stored base station location information and an azimuth of an antenna of each base station, display each base station and the antenna of each base station on a map by using a base station identifier and an antenna identifier respectively;
   a second display unit, configured to, according to a pre-stored range of cells covered by each antenna and environment information of each cell, obtain a configured neighboring cell of each cell, and display the cell covered by each antenna and the configured neighboring cell of each cell on the map;
   a third display unit, configured to, by using a frequency band identifier, display a frequency band mode used by each antenna on the map corresponding to each cell, wherein antennas using a same frequency band mode have same frequency band identifiers, and the frequency band mode is used to represent a frequency range used by each antenna for sending or receiving a signal;
   a searching and determining unit, configured to search for adjacent intra-frequency mode cells and determine an interfering cell, wherein if the cell covered by the antenna and the configured neighboring cell of the cell use a same frequency band mode, the cell covered by the antenna and the configured neighboring cell of the cell are adjacent intra-frequency mode cells to each other, and determine any one cell of the intra-frequency mode cells to each other to be the interfering cell; and
   an adjustment unit, configured to adjust the frequency band identifier used by the interfering cell, so that the interfering cell and the configured neighboring cell of the cell have different frequency band identifiers on the map, and according to the adjusted frequency band identifier of the interfering cell on the map, adjust the frequency band mode of the interfering cell to a frequency band mode corresponding to the adjusted frequency band identifier of the interfering cell.

7. The device for adjusting a frequency band mode according to claim 6, further comprising:
   a marking unit, configured to identify the interfering cell and the configured neighboring cell of the interfering cell on the map with different marks.

8. The device for adjusting a frequency band mode according to claim 6, wherein if a range of cells covered by a first antenna of a first base station and a range of cells covered by a second antenna of a second base station have an overlapping area, and it is determined, according to the pre-stored environment information, that no terrain that blocks signals exists between a cell covered by the first antenna and a cell covered by the second antenna, the cell covered by the first antenna and the cell covered by the second antenna are configured neighboring cells to each other.

9. The device for adjusting a frequency band mode according to claim 6, wherein a range of cells covered by each antenna is determined according to pre-stored configuration data, wherein the configuration data comprises distance between the cells, hanging height of the antenna of the cell, the azimuth of the antenna and a downtilt angle of the antenna.

10. The device for adjusting a frequency band mode according to claim 6, wherein the frequency band identifier specifically is a letter identifier or a color identifier.

* * * * *

UNITED STATES PATENT AND TRADEMARK OFFICE
CERTIFICATE OF CORRECTION

| | | |
|---|---|---|
| PATENT NO. | : 8,437,786 B1 | Page 1 of 1 |
| APPLICATION NO. | : 13/687933 | |
| DATED | : May 7, 2013 | |
| INVENTOR(S) | : Shaolei Wang | |

It is certified that error appears in the above-identified patent and that said Letters Patent is hereby corrected as shown below:

Title page, item (71), city/country of residence for Applicant should read -- Shenzhen, CHINA --.

Title page, item (72), inventor's name should read -- Shaolei Wang --.

Signed and Sealed this
Twenty-third Day of July, 2013

Teresa Stanek Rea
*Acting Director of the United States Patent and Trademark Office*